United States Patent

Kaltenbrunn et al.

[11] Patent Number: 5,209,203
[45] Date of Patent: May 11, 1993

[54] METHOD AND APPARATUS FOR CONTROLLING THE TORQUE OF AN ENGINE

[75] Inventors: Peter Kaltenbrunn, Bietigheim-Bissingen; Karl Ott, Markgröningen; Bernhard Schray; Ernst Wild, both of Oberriexingen, all of Fed. Rep. of Germany

[73] Assignee: Robert Bosch GmbH, Stuttgart, Fed. Rep. of Germany

[21] Appl. No.: 688,954

[22] PCT Filed: Dec. 6, 1988

[86] PCT No.: PCT/EP88/01108
§ 371 Date: May 17, 1991
§ 102(e) Date: May 17, 1991

[87] PCT Pub. No.: WO90/06441
PCT Pub. Date: Jun. 14, 1990

[51] Int. Cl.[5] .................. F02P 5/155; B60K 31/00
[52] U.S. Cl. .................................... 123/419; 180/197
[58] Field of Search .............. 123/416, 417, 418, 419, 123/436; 180/197

[56] References Cited

U.S. PATENT DOCUMENTS

| 4,178,891 | 12/1979 | Latsch et al. | 123/419 |
| 4,527,523 | 7/1985 | Daumer et al. | 123/419 |
| 4,739,856 | 4/1988 | Inagaki et al. | 180/197 |
| 4,811,224 | 3/1989 | Kuerschner et al. | 123/419 X |
| 4,843,552 | 6/1989 | Inagaki | 180/197 X |
| 4,856,610 | 8/1989 | Leiber et al. | 180/197 |
| 4,921,064 | 1/1990 | Wazaki et al. | 180/197 |
| 4,933,857 | 6/1990 | Hashiguchi et al. | 180/197 X |
| 4,936,405 | 6/1990 | Hrovat | 180/197 |
| 5,046,009 | 9/1991 | Abo et al. | 180/197 X |

FOREIGN PATENT DOCUMENTS 3526409 2/1986 Fed. Rep. of Germany .
2191539 12/1987 United Kingdom .

Primary Examiner—Willis R. Wolfe
Attorney, Agent, or Firm—Michael J. Striker

[57] ABSTRACT

The torque of an internal combustion engine is controlled during acceleration by monitoring differences between engine and wheel speed in order to provide a measure of phase differences in the event of the engine torque oscillating. The difference between the engine and wheel signals is integrated and fed to an ignition angle correction circuit in order to damp out the torque oscillations which would otherwise result.

10 Claims, 2 Drawing Sheets

METHOD AND APPARATUS FOR CONTROLLING THE TORQUE OF AN ENGINE

BACKGROUND OF THE INVENTION

The present invention relates to a method and apparatus for controlling the torque of an internal combustion engine.

It is known that there can occur conditions which result in the engine speed of a vehicle oscillating which in turn causes an oscillation in the torque output from the engine. The torque oscillation can sometimes be audible or even result in a physical oscillation of the vehicle which is commonly called "kangarooing" in the United Kingdom. In some vehicles, torque oscillation of the engine occurs due to a mismatch of the resonant frequencies of the engine, transmission and final drive and this is inherent at certain vehicle and engine speeds. It has already been proposed to mitigate the effects of this torque oscillation by monitoring the rate of change of engine speed and to alter the ignition timing so as to alter the torque output of the engine. In other words, when a drop in engine speed is detected by the monitoring operation, engine torque is increased by advancing the ignition in order to counteract the drop. An increase in engine speed is likewise counteracted by retarding the ignition so as to damp out the oscillation.

This system is only possible because the resonant conditions are known and also the amount of phase shift between engine and wheel speed of the vehicle is a constant under these conditions. The requisite ignition timing variation can therefore be evaluated.

There exists another set of conditions which may induce "kangarooing" and that is during acceleration. Here, the phase shift between engine and wheel speed is not constant and so the technique proposed above cannot be used.

SUMMARY OF THE INVENTION

It is therefore an object of the present invention to provide a method and an apparatus for controlling the torque of an engine which avoids the disadvantages of the prior art.

In keeping with these objects and with others which will become apparent hereinafter, one feature of the present invention resides, briefly stated, in a method of controlling the torque of an internal combustion engine of a vehicle, including the steps of deriving a signal indicative of the speed of the engine and varying the ignition angle in a direction to counteract variations in engine torque, wherein a further signal is derived indicative of the wheel speed of the vehicle, differences between the signals indicative of engine speed and wheel speed are detected, and the ignition angle is varied in response to the detected difference.

In accordance with another feature of the present invention, the difference signal can be integrated, and the integrated signal is used as input to a load/speed dependent engine ignition map.

Still another feature of the present invention is that the integration can be established by means of a feed back loop.

In accordance with a further feature of the present invention an apparatus is proposed which has means for deriving a signal indicative of the speed of the engine, means for deriving a further signal indicative of the wheel speed of the vehicle, means for subtracting the signals to produce a resultant signal, an integrator for integrating the resultant signal, and means for deriving ignition angle correction signals and including a feed back loop.

The integrator can have a time constant which is a function of the elasticity of transmission.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

A vehicle comprises engine, transmission, vehicle mass and tires. All these can be represented as a spring/mass system with natural frequencies which are excited by the acceleration of the vehicle.

Figure 1:
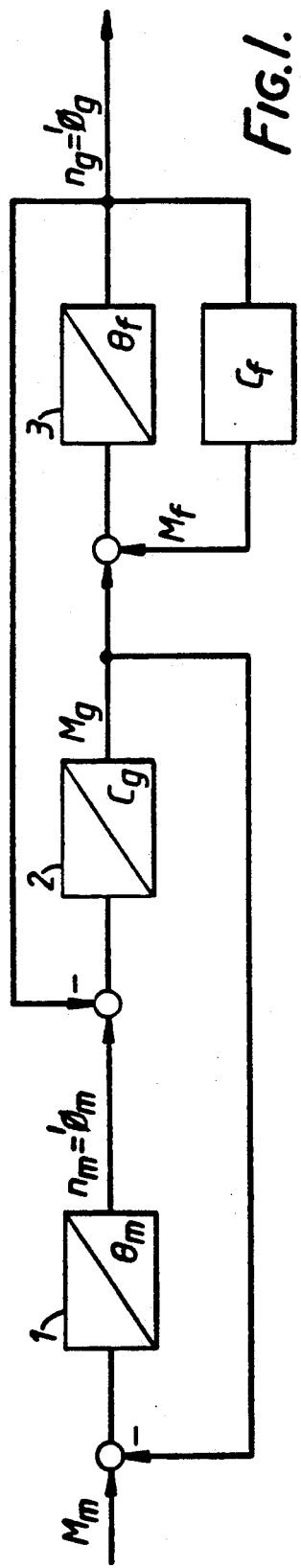
FIG. 1 is a basic block diagram representing a vehicle expressed as spring mass system.

The spring/mass system can be represented in simplified form as a two-mass oscillator, one mass being the engine and the other the vehicle. The vehicle mass can be transposed and considered as a mass moment of inertia to the rotating mechanical system. Keeping in mind that a transmission line as a spring elasticity, the differential equations which define the spring/mass system representing a vehicle are:

$$\theta_m \cdot \phi_m = M_m - M_g$$

$$M_g = C_g(\phi_m - \phi_g)$$

$$\theta_f \phi_g = M_g - M_f$$

$$M_f = C_f = \phi_g$$

Where $\phi_m$ is the angle of the shaft on the motor side
$\phi_g$ is the angle of the shaft on the transmission side
$1/C_g$ is the elasticity of the shaft
$C_f$ is a proportional factor related to the speed of the vehicle
$\theta_m$ is the moment of inertia of the engine
$\theta_f$ is the moment of inertia of the vehicle
$M_f$ is the counter-torque from the vehicle
$M_g$ is the torque on the shaft on the transmission side
$M_m$ is the torque on the shaft on the engine side These equations can be represented as a block diagram as shown in FIG. 1 where block 1 represents the moment of inertia of the engine, block 2 represents the elasticity of the transmission, and block 3 represents the movement of inertia of the vehicle. When the engine torque $M_m$ suddenly increases, an increasing counter torque $M_f$ results on the transmission side of the shaft and oscillates.

The present invention proposes to damp out the oscillation and hence the resultant "kangarooing" or acceleration bucking by altering the engine torque via a change in ignition angle in such a manner that the engine torque oscillates in the opposite phase so that the resultant torque which acts on the centrifugal mass of the engine becomes constant.

Figure 2:
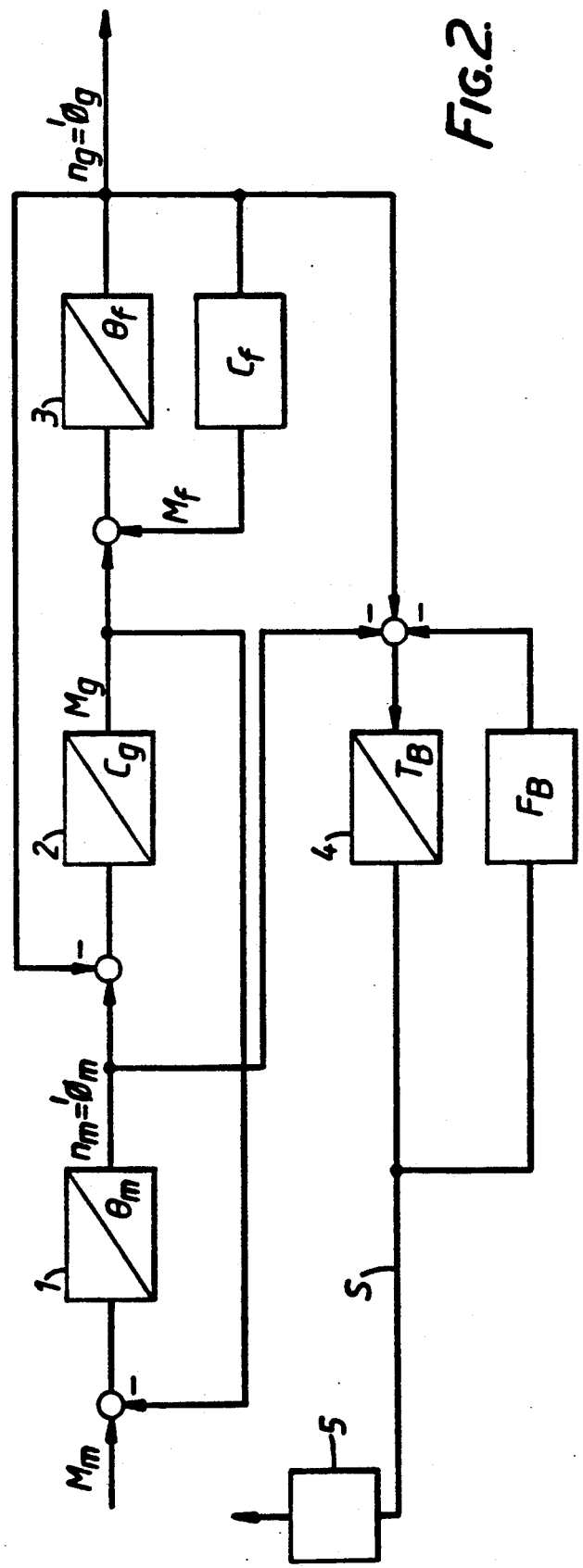
FIG. 2 is a block diagram similar to that shown in FIG. 1 but useful in explaining the effect of the present invention.
Figure 3:
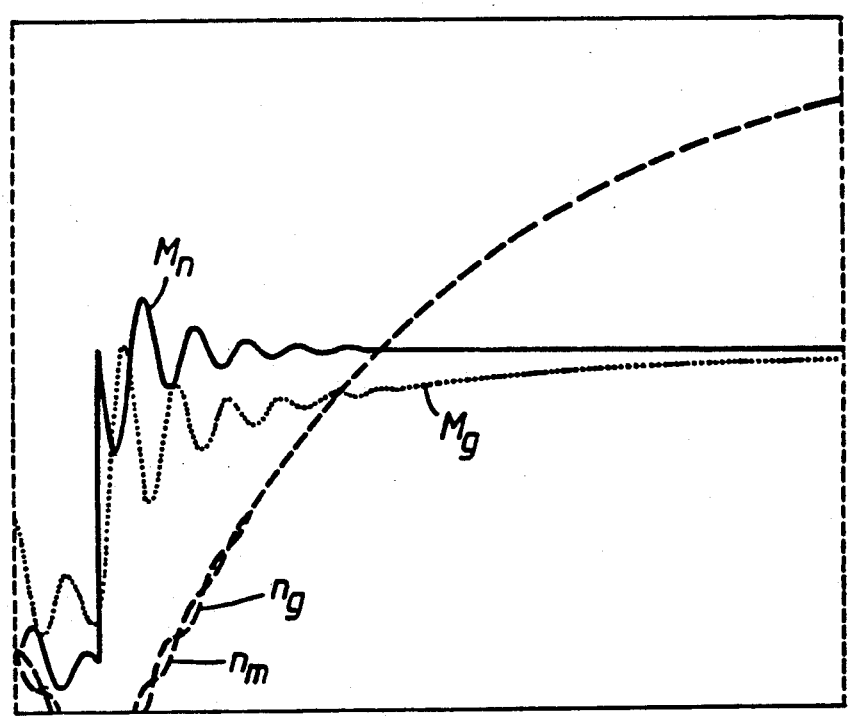
FIG. 3 is an oscillograph showing the effectiveness of the present invention with engine torque controlled to be in opposite phase to transmission torque.

FIG. 2 shows in diagrammatic terms how this may be achieved and is based on FIG. 1. The diagram shown in FIG. 2 differs from the basic diagram shown in FIG. 1 by the addition of a loop which takes signals representing engine and vehicle speeds. As was stated earlier, the phase difference between engine and wheel speed is not constant during acceleration bucking or "kangarooing". In FIG. 2, a signal $n_g$ indicative of vehicle speed is fed back and compared with a signal $n_m$ representing engine speed. The difference between $n_m$ and $n_g$, when transposed to the engine side, is then used to influence a transmission torque monitoring device 4 which includes an integrator. The output of the integrator of the monitoring device 4 supplies an output signal S which is converted via a load/speed dependent engine ignition map 5 into ignition timing corrections by means of which the engine torque is controlled to be in the phase opposite to that of the vehicle oscillations as shown in FIG. 3.

The integrator of the monitoring device preferably has a time constant $T_b$ which is approximately equal to the $C_g$, the rigidity of the transmission shaft. Further, the output signal S from the integrator is fed back as indicated by the block FB in order to cause the engine torque to oscillate for a period of time as shown in FIG. 3 but ultimately mesh with the vehicle torque. Further, the feed back connection ensures that under steady state conditions, there is zero output from the monitoring device, even with the engine speed not equal to the transposed vehicle speed.

The integrator may be either a counter for a digital system or a capacitor for an analogue system but care must be taken to ensure that whichever device is used, the correct time constant is achieved.

We claim:

1. A method of controlling a torque of an internal combustion engine of a vehicle, comprising the steps of deriving a signal indicative of a speed of an internal combustion engine of a vehicle; deriving a further signal indicative of a wheel speed of the vehicle; determining a difference signal between said signal indicative of the speed of the engine and said signal indicative of the wheel speed of the vehicle; and varying an ignition angle of an internal combustion engine in response to the determined difference signal to counteract variations in the torque of the internal combustion engine.

2. A method as defined in claim 1; and further comprising the step of integrating the difference signal; and using the integrating difference signal as an input to a load/speed dependent engine ignition map to vary the ignition angle.

3. A method as defined in claim 2, wherein said integrating includes establishing an integration by means of a feed back loop.

4. An apparatus for controlling a torque of an internal combustion engine of a vehicle, comprising means for deriving a signal indicative of a speed of an internal combustion engine of a vehicle; means for deriving a further signal indicative of a wheel speed of the vehicle; means for determining a difference signal between the signal indicative of the speed of the engine and the signal indicative of the wheel speed of the vehicle; and means for varying an ignition angle of the internal combustion engine in response to the determined difference signal.

5. An apparatus as defined in claim 4, wherein said means for determining is formed as means for subtracting the signal indicative of the speed of the engine and the signal indicative of the wheel speed of the vehicle to produce the difference signal as a resultant signal.

6. An apparatus as defined in claim 4, wherein said means for varying is formed as means for deriving ignition angle correction signals.

7. An apparatus as defined in claim 4; and further comprising an integrator connected with said determining means for integrating a difference signal to produce an integrated difference signal and also connected to said varying means for supplying the integrated difference signal to said varying means.

8. An apparatus as defined in claim 7, wherein said integrator or includes a feed back loop.

9. An apparatus as defined in claim 7, wherein said integrator has a time constant which is a function of an elasticity of a transmission.

10. An apparatus as defined in claim 8, wherein said integrator has a time constant which is a function of an elasticity of a transmission.

* * * * *